United States Patent
Buijs et al.

(10) Patent No.: US 8,931,306 B2
(45) Date of Patent: Jan. 13, 2015

(54) METHOD OF TREATING A HYDROCARBON STREAM COMPRISING METHANE, AND AN APPARATUS THEREFOR

(75) Inventors: Cornelis Buijs, The Hague (NL); Francois Chantant, The Hague (NL)

(73) Assignee: Shell Oil Company, Houston, TX (US)

( * ) Notice: Subject to any disclaimer, the term of this patent is extended or adjusted under 35 U.S.C. 154(b) by 39 days.

(21) Appl. No.: 13/807,340

(22) PCT Filed: Jun. 28, 2011

(86) PCT No.: PCT/EP2011/060826
§ 371 (c)(1),
(2), (4) Date: Dec. 28, 2012

(87) PCT Pub. No.: WO2012/000998
PCT Pub. Date: Jan. 5, 2012

(65) Prior Publication Data
US 2013/0096359 A1    Apr. 18, 2013

(30) Foreign Application Priority Data

Jun. 30, 2010 (EP) .................................... 10167839

(51) Int. Cl.
*B01D 53/04* (2006.01)
*C10L 3/10* (2006.01)
(Continued)

(52) U.S. Cl.
CPC ............. *B01D 53/0462* (2013.01); *C10L 3/106* (2013.01); *F25J 1/0212* (2013.01); *F25J 1/0214* (2013.01); *F25J 1/0238* (2013.01);
(Continued)

(58) Field of Classification Search
None
See application file for complete search history.

(56) References Cited

U.S. PATENT DOCUMENTS 5,537,827 A * 7/1996 Low et al. ...................... 62/613
5,832,745 A 11/1998 Klein Nagelvoort et al. .. 61/619
(Continued)

FOREIGN PATENT DOCUMENTS

DE        10226596     1/2004   ................ C07C 7/00
DE     102007007097   8/2008   ................ F25J 1/00
(Continued)

OTHER PUBLICATIONS

Elliott, D. et al.; "Benefits of Integrating NGL Extraction and LNG Liquefaction Technology"; Aiche 2005 Spring National Meeting; 5th Topical Conference on Natural Gas Utilization (TI); Session 16C-Gas; pp. 101-116 and p. 103, paragraph 5—p. 105, Paragraph 5; Jan. 1, 2005.

Primary Examiner — Tam M Nguyen

(57) ABSTRACT

A wet hydrocarbon stream having at least methane and water, provided at a temperature equal to a first temperature, is cooled thereby lowering the temperature to a second temperature. In a water removal device a wet disposal stream having water is withdrawn from the wet hydrocarbon stream, at the second temperature. An effluent stream having the wet hydrocarbon stream from which the wet disposal stream has been removed, is discharged from the water removal device and passed to a further heat exchanger. A refrigerant stream is also passed to the further heat exchanger, and both the effluent stream and the refrigerant stream are cooled in the further heat exchanger by indirect heat exchanging against an evaporating refrigerant fraction. The effluent stream is heated by indirectly heat exchanging against the wet hydrocarbon stream. The cooling of the wet hydrocarbon stream includes this indirectly heat exchanging.

13 Claims, 2 Drawing Sheets

Figure 1:
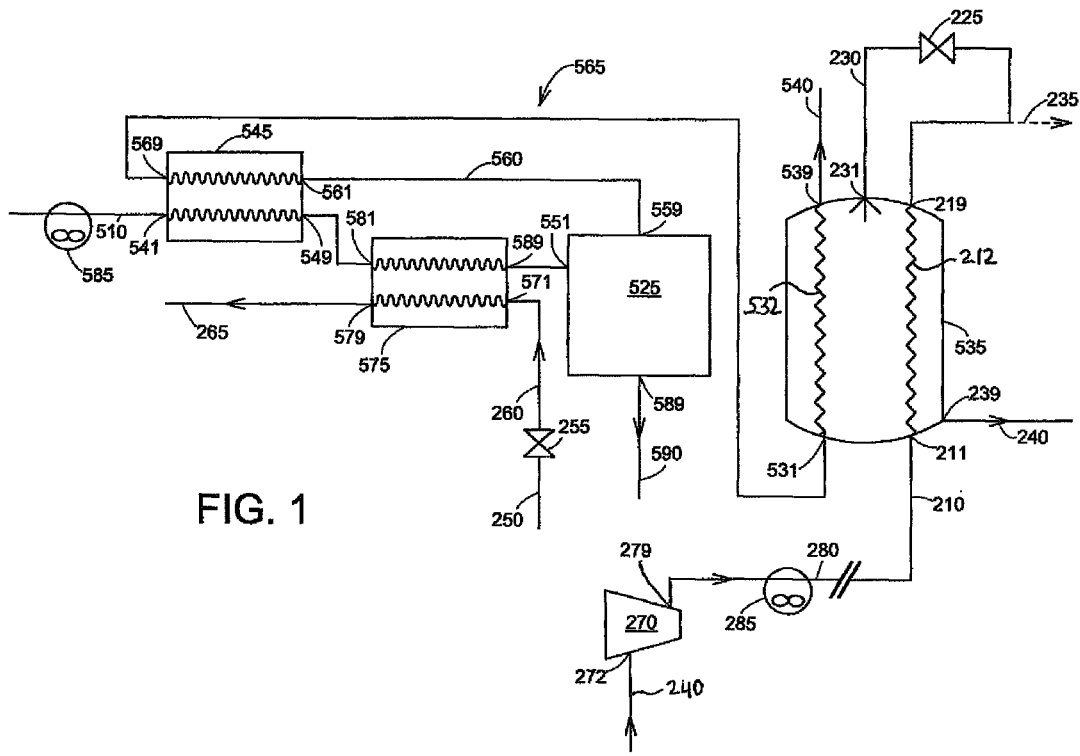

(51) Int. Cl.
*F25J 1/02* (2006.01)
*F25J 1/00* (2006.01)

(52) U.S. Cl.
CPC ............ *F25J 1/0022* (2013.01); *F25J 1/0052* (2013.01); *F25J 1/0055* (2013.01); *F25J 2220/68* (2013.01); *F25J 2290/12* (2013.01)
USPC .................... 62/619; 62/613; 62/612; 62/611

(56) References Cited

U.S. PATENT DOCUMENTS

| | | | |
|---|---|---|---|
| 6,347,531 B1 * | 2/2002 | Roberts et al. .................. | 62/612 |
| 6,370,910 B1 | 4/2002 | Grootjans et al. .............. | 62/613 |
| 2008/0115532 A1 | 5/2008 | Jager | |
| 2009/0064712 A1 | 3/2009 | Buijs et al. | |
| 2009/0064713 A1 | 3/2009 | Buijs et al. | |
| 2009/0301132 A1 * | 12/2009 | Evans et al. ...................... | 62/631 |
| 2012/0186296 A1 * | 7/2012 | Gnanendran et al. ........... | 62/637 |
| 2013/0269386 A1 * | 10/2013 | Brostow et al. ................. | 62/613 |

FOREIGN PATENT DOCUMENTS

| | | | |
|---|---|---|---|
| DE | 102007045303 | 4/2009 | ............. B01D 53/04 |
| FR | 2607718 | 6/1988 | ............... B01D 3/14 |
| GB | 1572900 | 8/1980 | ................ F25J 1/02 |
| GB | 2102930 | 2/1983 | ................ F25J 3/02 |
| WO | WO2006061400 | 6/2006 | |

* cited by examiner

METHOD OF TREATING A HYDROCARBON STREAM COMPRISING METHANE, AND AN APPARATUS THEREFOR

PRIORITY CLAIM

The present application claims priority from PCT/EP2011/060826, filed 28 Jun. 2011, which claims priority from European application 10167839.9, filed 30 Jun. 2010, which is incorporated herein by reference.

The present invention relates to a method and apparatus for treating a hydrocarbon stream comprising methane.

Hydrocarbon streams comprising methane can be derived from a number of sources, such as natural gas or petroleum reservoirs, or from a synthetic source such as a Fischer-Tropsch process. In the present invention, the hydrocarbon stream preferably comprises, or essentially consists of, natural gas. It is useful to treat and cool such streams for a number of reasons. It is particularly useful to liquefy the hydrocarbon stream.

Natural gas is a useful fuel source, as well as a source of various hydrocarbon compounds. It is often desirable to liquefy natural gas in a liquefied natural gas (LNG) plant at or near the source of a natural gas stream for a number of reasons. As an example, natural gas can be stored and transported over long distances more readily as a liquid than in gaseous form because it occupies a smaller volume and does not need to be stored at high pressure.

GB 1,572,900 discloses a process for the liquefaction of natural gas. The natural gas to be liquefied is pre-cooled in a heat exchanger in order to remove a quantity of water which is present in the natural gas. The pre-cooled natural gas leaves the heat exchanger and is passed to a phase separator in which condensed water is removed from the natural gas. Then the partly dried natural gas is passed to a conventional drier to remove the remaining water from the natural gas. This conventional drier is, for example, of the kind containing a suitable desiccant. From the conventional drier the natural gas is passed to an inlet of a coil in a heat exchanger in order to be liquefied. A first mixed refrigerant is also passed to coils in the heat exchanger, as well as a second mixed refrigerant.

A drawback of the method and apparatus of GB 1,572,900 is that there may be quite a high temperature difference between the two refrigerant streams and the dried natural gas stream from the conventional drier, as they enter the heat exchanger. This, in turn, may cause thermal stresses (in particular in coil-wound heat exchangers) and internal pinching in the heat exchanger, which may lead to unstable behaviour in the cooling process and damage to the heat exchanger.

The present invention provides a method of treating a hydrocarbon stream comprising methane, the method comprising:

providing a wet hydrocarbon stream comprising at least methane and water;

passing said wet hydrocarbon stream through a wet feed ambient heat exchanger thereby heat exchanging said wet hydrocarbon stream against ambient and thereby providing the wet hydrocarbon stream at a temperature equal to a first temperature;

cooling of the wet hydrocarbon stream thereby lowering the temperature from the first temperature to a second temperature;

withdrawing from the wet hydrocarbon stream, in a water removal device at the second temperature, at least one wet disposal stream comprising water from the wet hydrocarbon stream and an effluent stream comprising the wet hydrocarbon stream from which the at least one wet disposal stream has been removed;

passing the effluent stream to a further heat exchanger;

passing a refrigerant stream in a compressed condition through an ambient heat exchanger thereby providing a source refrigerant stream at a refrigerant temperature equal to a third temperature, which is within 10° C. from the first temperature;

passing at least a part of the source refrigerant stream to the further heat exchanger while maintaining its temperature essentially equal to the third temperature;

cooling both the effluent stream and the at least the part of the refrigerant stream in the further heat exchanger by indirect heat exchanging against an evaporating refrigerant fraction; wherein said passing of the effluent stream to the further heat exchanger comprises heating the effluent stream by indirectly heat exchanging against the wet hydrocarbon stream at essentially said first temperature in a wet feed heat exchanger match the temperature of the effluent stream to the first temperature as close as the warm end approach temperature of the wet feed heat exchanger, wherein said cooling of the wet hydrocarbon stream comprises this indirectly heat exchanging.

In another aspect, the present invention provides an apparatus for treating a hydrocarbon stream comprising methane, the apparatus comprising:

a supply conduit for providing a wet hydrocarbon stream that comprises at least methane and water;

a wet feed ambient heat exchanger connected to the supply conduit arranged to receive the wet hydrocarbon stream and to exchange heat between the wet hydrocarbon stream and an ambient stream;

at least one wet feed heat exchanger connected to the supply conduit via the wet feed ambient heat exchanger, and arranged to receive the wet hydrocarbon stream from the wet feed ambient heat exchanger, and to lower the temperature of the wet hydrocarbon stream, wherein there is essentially no separate heat exchanger present between the wet feed ambient heat exchanger and the wet feed heat exchanger;

a water removal device arranged to receive the wet hydrocarbon stream downstream of the wet feed heat exchanger, comprising a wet disposal stream outlet for discharging a wet disposal stream comprising water from the wet hydrocarbon stream, and a vapour outlet for discharging an effluent stream comprising the wet hydrocarbon stream from which the wet disposal stream has been removed;

a supply of a source refrigerant stream comprising a refrigerant stream in a compressed and ambient cooled condition, said supply comprising a refrigerant ambient heat exchanger and a compressor which discharges the refrigerant in compressed condition to the refrigerant ambient heat exchanger, which ambient heat exchanger is arranged to exchange heat between the refrigerant in compressed condition and ambient thereby providing the source refrigerant stream;

a further heat exchanger provided with a first tube bundle inlet for receiving at least part of the effluent stream from the water removal device and at least one second tube bundle inlet, wherein the further heat exchanger is further provided with a first tube bundle outlet for discharging a cooled hydrocarbon stream, wherein the first tube bundle outlet is internally in the further heat exchanger connected with the first tube bundle inlet via a first tube bundle, and wherein the further heat exchanger is further provided with at least one second tube bundle outlet for discharging at least one cooled refrigerant stream, wherein the at least one second tube bundle outlet is internally in the further heat exchanger connected with the second tube bundle inlet via a second tube bundle, and wherein said first and second tube bundles are arranged in a heat exchanging relationship with an evaporating refrigerant fraction inside the further heat exchanger;

first connecting means connecting the vapour outlet of the water removal device with the first tube bundle inlet of the further heat exchanger, which first connecting means passes through the wet feed heat exchanger in indirect heat exchanging interaction with the wet hydrocarbon stream; and second connecting means connecting the refrigerant ambient heat exchanger with the second inlet, for receiving at least a part of said source refrigerant stream, and said fluid connection being essentially free from any separate heat exchanger.

Figure 2:
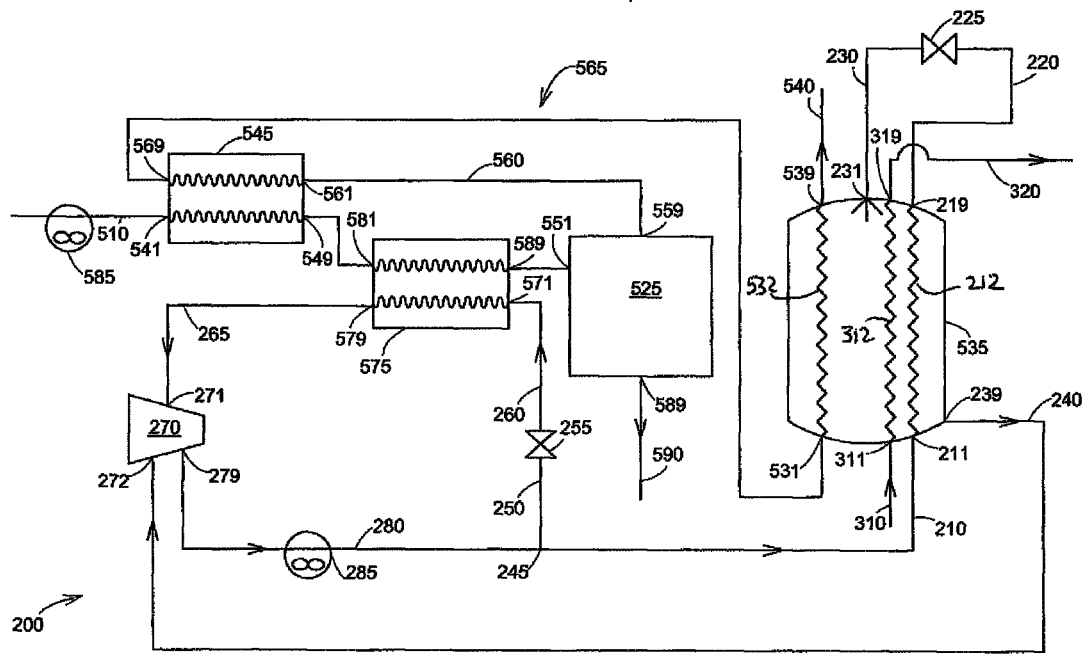
Figure 3:
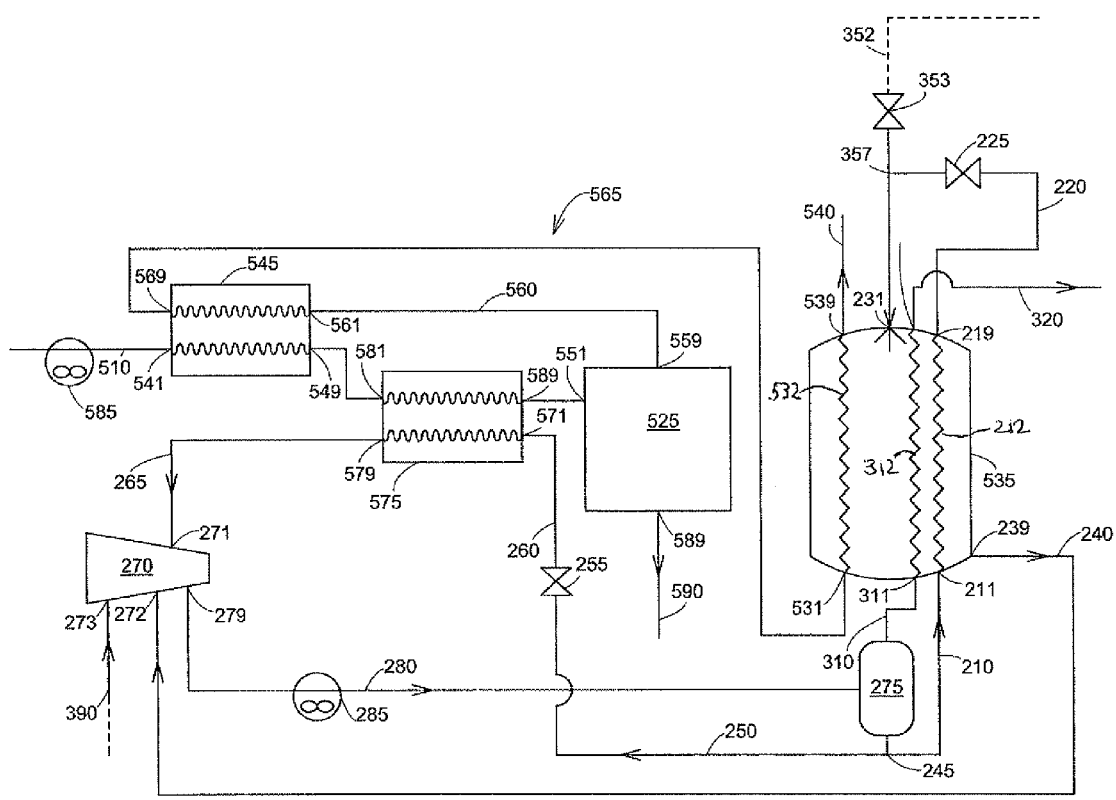

The invention will be further illustrated hereinafter, using examples and with reference to the drawing in which;

FIG. 1 schematically represents a process flow scheme representing a method and apparatus according to embodiments of the invention;

FIG. 2 schematically represents a process flow scheme representing a method and apparatus according to another embodiment of the invention;

FIG. 3 schematically represents a process flow scheme representing a method and apparatus according to still another embodiment of the invention.

In these figures, same reference numbers will be used to refer to same or similar parts. Furthermore, a single reference number will be used to identify a conduit or line as well as the stream conveyed by that line.

The present description concerns removal of a wet disposal stream from a wet hydrocarbon stream in a water removal device, yielding an effluent stream comprising the wet hydrocarbon stream from which the wet disposal stream has been removed.

FIGS. 1 to 3 schematically show process flow schemes for treating a hydrocarbon stream. First will be described some of the basic features common to the embodiments illustrated in FIGS. 1 to 3.

FIGS. 1 to 3 generally illustrate various embodiments of an apparatus for treating a hydrocarbon stream comprising methane, wherein is provided:

a supply conduit for providing a wet hydrocarbon stream 510 that comprises at least methane and water;

at least one wet feed heat exchanger 545 connected to the supply conduit arranged to receive the wet hydrocarbon stream 510 and to lower the temperature of the wet hydrocarbon stream 510;

a water removal device 525 arranged to receive the wet hydrocarbon stream 510 downstream of the wet feed heat exchanger 545, comprising a wet disposal stream outlet 589 for discharging a wet disposal stream 590 comprising water from the wet hydrocarbon stream, and a vapour outlet 559 for discharging an effluent stream 590 comprising the wet hydrocarbon stream from which the wet disposal stream 590 has been removed;

a further heat exchanger 535 provided with a first tube bundle inlet 531 for receiving at least part of the effluent stream 560 from the water removal device 525 and at least one second tube bundle inlet 211 for receiving at least a part 210 of a source refrigerant stream 280, the further heat exchanger 535 also provided with a first tube bundle outlet 539, which is internally in the further heat exchanger connected with the first tube bundle inlet 531, for discharging a cooled hydrocarbon stream 540 and at least one second tube bundle outlet 219, which is internally in the further heat exchanger connected with the second tube bundle inlet 211, for discharging at least one cooled refrigerant stream 220;

first connecting means 565 connecting the vapour outlet 559 of the water removal device 525 with the first tube bundle inlet 531 of the further heat exchanger 535, which first connecting means 565 passes through the wet feed heat exchanger 545 in indirect heat exchanging interaction with the wet hydrocarbon stream 510.

FIGS. 1 to 3 generally illustrate various embodiments of a method of treating a hydrocarbon stream comprising methane, the method comprising:

providing a wet hydrocarbon stream 510 comprising at least methane and water, at a temperature equal to a first temperature;

cooling of the wet hydrocarbon stream 510 thereby lowering the temperature to a second temperature;

withdrawing from the wet hydrocarbon stream, in a water removal device 525 at the second temperature, at least one wet disposal stream 590 comprising water from the wet hydrocarbon stream and an effluent stream 560 comprising the wet hydrocarbon stream from which the at least one wet disposal stream 590 has been removed;

passing the effluent stream 560 to a further heat exchanger 535;

passing at least a part 210 of a source refrigerant stream 280 to the further heat exchanger 535;

cooling both the effluent stream 560 and the part 210 of the source refrigerant stream 280 in the further heat exchanger 535 by indirect heat exchanging against an evaporating refrigerant fraction 230;

wherein said passing of the effluent stream 560 to the further heat exchanger 535 comprises heating the effluent stream 560 by indirectly heat exchanging against the wet hydrocarbon stream 510, wherein said cooling of the wet hydrocarbon stream 510 comprises this indirectly heat exchanging.

It is presently proposed to indirectly exchange heat, for instance using the wet feed heat exchanger 545, between the effluent stream 560 and the wet hydrocarbon stream 510 preferably prior to its admission into the water removal device 525. Herewith it is achieved that the temperature of the effluent stream is restored, within the limits of the approach temperature of the wet feed heat exchanger 545, to better match the temperature of the wet hydrocarbon stream 510.

This way, the temperature difference between the effluent stream, suitably in the form of "dried hydrocarbon feed gas", and the refrigerant stream is substantially the same, such as the same within the approach temperature of the wet feed heat exchanger 545—for instance within 10° C. or preferably within 5° C.—as the temperature difference between the original wet hydrocarbon stream and the source refrigerant stream 280, regardless of the temperature conditions in the water removal device 525.

As a result, any pinching and thermal stress that may be induced in the further heat exchanger 535 when the effluent stream and the refrigerant streams are fed into such further heat exchanger 535 would not be significantly worse than would be the case if the wet hydrocarbon stream would be passed to the further heat exchanger without having passed through the water removal device 525.

Preferably, the wet hydrocarbon stream 510 and the source refrigerant stream 280 may have substantially the same temperature, for instance within 10° C. from each other, preferably within 5° C. from each other. This can for instance be achieved by heat exchanging both the wet hydrocarbon stream and the refrigerant stream against ambient.

In addition to the indirect heat exchanging between the effluent from the water removal device and the wet hydrocarbon stream, heat may be extracted from at least one of:

the wet hydrocarbon stream in or after the wet feed heat exchanger;

the effluent stream in or before the wet feed heat exchanger;

the wet hydrocarbon stream in the water removal device; by heat exchanging, preferably indirectly heat exchanging, against an auxiliary refrigerant stream. This way the wet hydrocarbon stream is further cooled down, and/or its temperature lowered.

The wet hydrocarbon stream, as well as the dried effluent stream, contains methane. The wet hydrocarbon stream may be obtained from natural gas or petroleum reservoirs or coal beds. As an alternative the hydrocarbon stream may also be obtained from another source, including as an example a synthetic source such as a Fischer-Tropsch process. Preferably the hydrocarbon stream comprises at least 50 mol % methane, more preferably at least 80 mol % methane.

Depending on the source, the wet hydrocarbon stream may contain varying amounts of other components, including one or more non-hydrocarbon components other than water, such as $N_2$, $CO_2$, Hg, $H_2S$ and other sulphur compounds; and one or more hydrocarbons heavier than methane such as in particular ethane, propane and butanes, and, possibly lesser amounts of pentanes and aromatic hydrocarbons. Hydrocarbons with a molecular mass of at least that of propane may herein be referred to as $C_3+$ hydrocarbons, and hydrocarbons with a molecular mass of at least that of ethane may herein be referred to as $C_2+$ hydrocarbons.

If desired, the wet hydrocarbon stream may have been pre-treated to reduce and/or remove one or more of undesired components such as $CO_2$ and $H_2S$, or have undergone other steps such as pre-pressurizing or the like. Such steps are well known to the person skilled in the art, and their mechanisms are not further discussed here. The composition of the wet hydrocarbon stream thus varies depending upon the type and location of the gas and the applied pre-treatment(s).

The apparatuses and methods embodied in the process flow schemes shown in FIGS. 1 to 3 all start with a supply conduit for providing a wet hydrocarbon stream 510. The wet hydrocarbon stream 510 comprises at least methane and water. A wet feed ambient heat exchanger 585 is arranged in the wet hydrocarbon stream 510 supply conduit, upstream of the heat feed heat exchanger 545.

The wet feed heat exchanger 545 is connected to the supply conduit 510 downstream of the wet feed ambient heat exchanger 585. The wet feed heat exchanger 545 is arranged to receive the wet hydrocarbon stream 510, and to lower the temperature of the wet hydrocarbon stream 510.

There is essentially no separate heat exchanger present between the wet feed ambient heat exchanger and the wet feed heat exchanger. Thus, no heat exchanging with another medium will be taking place other than deminimis unavoidable heat exchanging with the environment via the piping used for the supply conduit 510 downstream of the wet feed ambient heat exchanger 585. The temperature of the wet hydrocarbon stream as it passes into the wet feed heat exchanger 545 is therefore essentially equal to the first temperature, which is the temperature of the wet hydrocarbon stream as it is discharged from the wet feed heat exchanger 585. In practice this may mean that the temperature of the wet hydrocarbon stream as it passes into the wet feed heat exchanger 545 is less than 5° C. different, preferably less than 2° C. different, from the first temperature.

The wet feed heat exchanger 545 may be provided in the form of a tube in shell type heat exchanger or pipe in pipe heat exchanger, but preferred is a plate-type heat exchanger such as a plate-fin heat exchanger and/or a printed circuit heat exchanger, optionally in a cold box.

An auxiliary heat exchanging arrangement, here shown in the form of a water removal heat exchanger 575, is also provided to further lower the temperature of the wet hydrocarbon stream 510.

The water removal device 525 is arranged to receive the wet hydrocarbon stream 510 that has passed through at least the wet feed heat exchanger 545. Typically the water removal device comprises a first water removal device inlet 551 to receive the to receive the wet hydrocarbon stream 510 through; at least one wet disposal stream outlet 589, for discharging at least one wet disposal stream 590 that comprises water from the wet hydrocarbon stream; and a vapour outlet 559 for discharging an effluent stream 590 comprising the wet hydrocarbon stream from which the at least one wet disposal stream 590 has been removed.

The further heat exchanger 535 comprises a first tube bundle inlet 531 for receiving at least a part of the effluent stream 560 from the water removal device 525; and at least one second tube bundle inlet 211 for receiving at least a part 210 of the source refrigerant stream 280. The further heat exchanger 535 is preferably embodied in the form of a coil-wound heat exchanger. In such a case, the further heat exchanger 535 is also provided with a first tube bundle outlet 539, which is internally in the further heat exchanger connected with the first tube bundle inlet 531 via a first tube bundle 532 passing though a cooling zone in the further heat exchanger. A cooled hydrocarbon stream 540 is discharged via the first outlet 539. The further heat exchanger further comprises at least one second outlet 219, which is internally in the further heat exchanger connected with the second inlet 211, via a second tube bundle 212 passing through the cooling zone. The first and second tube bundles (532,212) are arranged in a heat exchanging relationship with an evaporating refrigerant fraction inside the further heat exchanger 535. A cooled refrigerant stream 220 is discharged from the further heat exchanger via the second tube bundle outlet 219.

Additionally, the further heat exchanger 535 is provided with a shell inlet 231 to provide access to the cooling zone, and a shell outlet 239 to discharge spent refrigerant from the cooling zone. The second tube bundle outlet 219 is connected to the shell inlet 231 via lines 220 and 230 which are connected to each other via an expansion device that is here shown in the form of a Joule-Thomson valve 225. The shell outlet 239 discharges into line 240.

The refrigerant may be a single-component refrigerant such as propane, but is preferably a multicomponent refrigerant. For example, the multicomponent refrigerant may contain a mixture of hydrocarbon components including one or more of pentanes, butanes, propane, propylene, ethane, and ethylene.

Furthermore, there is provided a refrigerant circuit (not shown), which comprises a supply of a source refrigerant stream 280. The supply comprises at least an ambient heat exchanger 285 and refrigerant compressor 270, which discharges the refrigerant in compressed condition to the refrigerant ambient heat exchanger 285.

The refrigerant ambient heat exchanger 285 may for example be provided in the form of an air cooler or a water cooler. The refrigerant compressor 270, together with the refrigerant ambient heat exchanger 285 provide the refrigerant source stream 280 in the form of a compressed and ambient cooled refrigerant stream in line 280. The temperature of the source refrigerant stream 280 is equal to a third temperature, typically at a value within 10° C. from the first temperature, which is the temperature at which the wet hydrocarbon stream 510 is discharged from the wet feed ambient heat exchanger 585.

Line 280 may be connected to line 210. Thus at least a part 210 of the refrigerant source stream 280 can be passed to the second tube bundle inlet 211 in the further heat exchanger 535 via line 210, such that the refrigerant ambient heat exchanger 285 is located upstream of the second tube bundle inlet 211 of the further heat exchanger 585. Spent refrigerant in line 240 is conveyed back to the refrigerant compressor 270 (optionally via a suction drum, not shown) where it can be recompressed and cooled against ambient, to provide the source refrigerant stream 280. Specific embodiments of the refrigerant circuit will be further illustrated herein below with specific reference to FIGS. 2 and 3.

The apparatuses of FIGS. 1 to 3 further contain first connecting means 565, connecting the vapour outlet 559 of the water removal device 525 with the first tube bundle inlet 531 of the further heat exchanger 535. The first connecting means passes through the wet feed heat exchanger 545 in indirect heat exchanging interaction with the wet hydrocarbon stream 510. Thus, the wet feed heat exchanger 545 comprises:

a first inlet 541 into the wet feed heat exchanger 545 in fluid communication with the supply conduit for the wet hydrocarbon stream 510;

a first outlet 549 from the wet feed heat exchanger 545 in fluid communication with a first inlet 551 of the water removal device 525, which first outlet 549 is connected to the first inlet 541 through the wet feed heat exchanger 545;

a second inlet 561 into the wet feed heat exchanger 545 in fluid communication with the vapour outlet 559 of the water removal device 525;

a second outlet 569 from the wet feed heat exchanger 545 in fluid communication with the first inlet 531 of the further heat exchanger 535, which second outlet 569 is connected to the second inlet 561 through the wet feed heat exchanger 545.

Preferably, the wet feed heat exchanger 545 may be installed in a counter current operating mode. In particular, the second outlet 569 may be located on the same heat exchanging side of the wet feed heat exchanger 545 as the first inlet 541 while the second inlet 561 may be located on the same heat exchanging side of the wet feed heat exchanger 545 as the first outlet 549. The second outlet discharges to the first inlet 531 of the further heat exchanger 535.

The water removal device 525 may be of any suitable known type. It may typically comprise a separator vessel for separating precipitated components from the wet hydrocarbon stream 510, and downstream thereof a water sorbing device for absorbing or adsorbing remaining water components from the residue vapour from which the precipitated components have been removed. Common in the field are solid bed dehydration units, also referred to as dry desiccant dehydration units. Typically, multiple beds are in use in a cyclic mode of operation involving drying (absorbing or adsorbing) and regeneration (desorbing). Preferably, the water sorbing device is also capable of removing mercury from the wet hydrocarbon stream, which can be facilitated by an appropriate selection of the sorbent employed in the solid bed.

In FIGS. 1 to 3, the auxiliary heat exchanging arrangement, to further lower the temperature of the wet hydrocarbon stream 510 to facilitate the drying, is embodied in the form of water removal heat exchanger 575 arranged between the first outlet 549 from the wet feed heat exchanger 545 and the first water removal device inlet 551 into the water removal device 525. Herewith heat can be extracted from the wet hydrocarbon stream 510 between the first outlet 549 from the wet feed heat exchanger 545 and the first water removal device inlet 551 into the water removal device 525. Alternatively or additionally, the auxiliary heat exchanging arrangement could comprise an auxiliary heat exchanger in the effluent stream 560, between the vapour outlet 559 from the water removal device 525 and the second inlet 569 into the wet feed heat exchanger 545. Still alternatively or additionally, a heat exchanging arrangement could be in the water removal device 525 to extract heat from the wet hydrocarbon stream inside the water removal device.

Finally, still alternatively or additionally, the heat exchanging arrangement could be integrated with the wet feed heat exchanger 545. In that case, the wet feed heat exchanger 545 is most suitably provided in the form of a plate-type heat exchanger, optionally in a cold box, and comprising an auxiliary inlet and an auxiliary outlet (not shown) that communicate with an additional set of channels or chambers of the wet feed heat exchanger 545 to extract heat from the wet hydrocarbon stream 510 and/or the effluent stream 560.

In each of these cases, an auxiliary refrigerant stream 250 is used in the auxiliary heat exchanging arrangement to extract heat.

The embodiments work as follows. The wet hydrocarbon stream 510 is provided at a temperature equal to a first temperature. If the optional wet feed ambient heat exchanger 585 is employed, the first temperature is controlled by heat exchanging against an ambient stream, such as for instance an air stream or a water stream. The first temperature may be within 10° C. from ambient temperature. For the purpose of the present disclosure, ambient temperature is the temperature of the air stream or the water stream against which the wet hydrocarbon stream 510 is heat exchanged. Ambient temperature may for instance lie in the range of from 0 to 50° C.

The wet hydrocarbon stream 510 is cooled, whereby the temperature is lowered to second temperature. In the embodiments as shown in FIGS. 1 to 3, the cooling is achieved by indirect heat exchanging in the wet feed heat exchanger 545 followed by indirect heat exchanging against an auxiliary refrigerant 250 in the water removal heat exchanger 575. Instead of or in addition to the water removal heat exchanger 575, other auxiliary heat exchanging arrangements described herein may be employed. The wet hydrocarbon stream is passed into the water removal device 525 through the first water removal device inlet 551 into the water removal device 525, where at least water, and optionally mercury, is removed from the wet hydrocarbon stream at the second temperature. At least one wet disposal stream 590 comprising water from the wet hydrocarbon stream, and an effluent stream 560 comprising the wet hydrocarbon stream from which the at least one wet disposal stream 590 has been removed are produced in the water removal device 525. The effluent stream 560, containing the wet hydrocarbon stream from which components including water, and optionally mercury, have been removed, is discharged from the water removal device 525 through the vapour outlet 559 from the water removal device 525. The wet disposal stream 590 is discharged from the water removal device 525 via wet disposal stream outlet 589, for further treatment (not shown) and disposal (not shown).

The effluent stream 560 is passed to the further heat exchanger 535 via the first connecting means 565, and at least one part 210 of the source refrigerant stream 280 is passed to the further heat exchanger 535 as well. The latter is passed to the further heat exchanger 535 while maintaining its temperature essentially equal to the third temperature. To this end, it will not be passed through a deliberate heat exchanger and no heat exchanging with another medium will be taking place other than de-minimis unavoidable heat exchanging with the environment via the piping used for line 210. In practice this may mean that the temperature of the part 210 of the source refrigerant stream 280 that passes through the second tube bundle inlet 211 is less than 5° C. different, preferably less than 2° C. different, from the temperature of the source refrigerant stream 280 as it is discharged from the refrigerant ambient heat exchanger 285.

Preferably, the temperature of the at least one part 210 of the source refrigerant stream, as it passes through the second tube bundle inlet 211 in the further heat exchanger 535, is within 10° C. from the first temperature. One way of achieving this is by passing the refrigerant through the refrigerant ambient heat exchanger 285 and heat exchanging it against the same type of ambient stream as the wet hydrocarbon stream 510.

While it is possible to install a further heat exchanger in the effluent stream 560 between the wet feed heat exchanger 545 and the further heat exchanger 535 in order to even better approach the first temperature and/or the third temperature, for reasons of capital expenditure control and operational simplicity it is preferred that the temperature of the effluent stream 560 in the first tube bundle inlet 531 is essentially the same as the temperature of the effluent stream 560 that was reached by the indirectly heat exchanging against the wet hydrocarbon stream 510 in the wet feed heat exchanger 545. To this end, the first connecting means is preferably essentially free from any separate heat exchanger between the wet feed heat exchanger 545 and the first tube bundle inlet 531 of the further heat exchanger 535. The effluent stream 560 that is discharged from the wet feed heat exchanger 545 is thus preferably not passed through any deliberate heat exchanger, and no heat exchanging with another medium will be taking place other than de-minimis unavoidable heat exchanging with the environment via the piping used for the connection between the wet feed heat exchanger 545 and the first tube bundle inlet 531 of the further heat exchanger 535. In practice this may mean that the temperature of the effluent stream 560 that passes through the first tube bundle inlet 531 is less than 5° C. different, preferably less than 2° C. different, from the temperature of the effluent stream 560 as it is discharged from the wet feed heat exchanger 545.

Both the effluent stream 560 and the part 210 of the source refrigerant stream 280 that is passed to the further heat exchanger 535 are cooled in the further heat exchanger 535, by indirect heat exchanging against an evaporating refrigerant fraction 230. The evaporating refrigerant fraction is passed into the shell side of the further heat exchanger 535 via the shell inlet 231. The evaporating refrigerant may be a separate refrigerant from the part of the source refrigerant in line 210 that is being cooled. However, as shown in FIG. 1, it may be a part or all of the cooled refrigerant 220 that exits the further heat exchanger 535 via the second tube bundle outlet 219 into line 220. In the embodiments of FIGS. 1 to 3, the evaporating refrigerant 230 is obtained by expanding at least a part of the cooled refrigerant 220 with the Joule-Thomson valve 225. Optionally, a remaining part of the cooled refrigerant is passed to another heat exchanger (not shown) in the form of continuing refrigerant stream 235 to be evaporated at a lower pressure than the evaporating refrigerant 230.

The passing of the effluent stream 560 to the further heat exchanger 535 comprises heating of the effluent stream 560 by indirectly heat exchanging against the wet hydrocarbon stream 510. Thus, the cooling of the wet hydrocarbon stream 510 mentioned above comprises this indirectly heat exchanging of the effluent stream 560 against the wet hydrocarbon stream 510. In more detail, the wet hydrocarbon stream 510 is passed from the first inlet 541 into a wet feed heat exchanger 545, through the wet feed heat exchanger 545 in indirect heat exchanging interaction with the effluent stream 560, to the first outlet 549 from the wet feed heat exchanger 545. Simultaneously, the effluent stream 560 is passed from second inlet 561 into the wet feed heat exchanger 545, through the wet feed heat exchanger 545 in indirect heat exchanging interaction with the wet hydrocarbon stream 510, to the second outlet 569 from the wet feed heat exchanger 545.

In order to bring the temperature of the effluent stream 560 closer to the temperature of the part 210 of the source refrigerant stream 280, before feeding at least parts of both streams to the further heat exchanger 535, the dried effluent stream 560 is indirectly heat exchanged against the wet hydrocarbon stream 510. The effect is that the second temperature, at which the wet hydrocarbon stream is dried in the water removal device 525, is more or less "decoupled" or "isolated" from the first temperature of the wet hydrocarbon stream 510 and the temperature of the effluent stream discharged from outlet 569 on the other side of the wet feed heat exchanger 545.

The effluent stream 560 discharged from the wet feed heat exchanger 545 and at least a part of the source refrigerant stream 280 can then be passed to the further heat exchanger 535 with a much smaller temperature difference, e.g. less than 10° C. or preferably less than 5° C., than would be the case if the effluent stream 560 would be directly passed from the vapour outlet 559 of the water removal device 525 to the first tube bundle inlet 531 of the further heat exchanger 535.

Thus, preferably the temperature of the effluent stream 560 as admitted into the further heat exchanger 535 via the first tube bundle inlet 531 is within less than 10° C., preferably within less than 5° C., different from the temperature of the at least part 210 of the source refrigerant stream 280 as it is admitted into the further heat exchanger 535 via the second tube bundle inlet 211.

Both the effluent stream 560 and the at least part 210 of the source refrigerant stream 280 are cooled in the further heat exchanger 535, thereby providing a cooled methane-containing hydrocarbon stream 540 and at least one cooled refrigerant stream 220.

In the embodiments illustrated by FIGS. 1 to 3, heat is extracted from the wet hydrocarbon stream 510 via the water removal heat exchanger 575 arranged in the path of the wet hydrocarbon stream 510 between the wet feed heat exchanger 545 and the water removal device 525. The invention is not limited to extracting heat at that location. More generally, the auxiliary refrigerant stream 250 can be employed to extract heat from any one of:

the wet hydrocarbon stream 510 between the first inlet 541 into the wet feed heat exchanger 545 and the first water removal device inlet 551 into the water removal device 525;

the effluent stream 560 between the vapour outlet 559 from the water removal device 525 and the second outlet 569 from the wet feed heat exchanger 545; and the wet hydrocarbon stream in the water removal device 525.

Preferably, the auxiliary refrigerant 250 is cycled in a refrigerant circuit, employing at least a compressor and an expansion device, wherein the auxiliary refrigerant 250 is expanded. FIG. 1 shows a Joule-Thomson valve 255 in line 250 as expansion device. The expanded auxiliary refrigerant stream 260 is passed into the water removal heat exchanger 575 and discharged from the same after it has extracted heat from the wet hydrocarbon stream 510. The discharged auxiliary refrigerant 265 is recompressed.

The auxiliary refrigerant can be a refrigerant stream obtained from a separate and/or dedicated refrigerant cycle, in which case the auxiliary refrigerant can be of any suitable composition, or it can be derived from a refrigerant circuit that is also used to provide refrigerant to another heat exchanger. In the latter option, less additional equipment is necessary, because compressors and such are already provided in the refrigerant circuit. FIGS. 2 to 3 illustrate embodiments wherein the auxiliary refrigerant stream 250 and the at least part 210 of the source refrigerant stream 280 both are supplied from the source refrigerant stream 280. Preferably, the source refrigerant stream 280 is at least partially condensed, for instance by the heat exchanging against the ambient stream in the refrigerant ambient heat exchanger 285, thereby forming a liquid refrigerant. In such a case, the auxiliary refrigerant stream 250 preferably comprises at least a part of the liquid refrigerant.

Starting with FIG. 2, for example, the auxiliary refrigerant is obtained from refrigerant circuit 200. The refrigerant circuit 200 comprises a refrigerant compressor 270, optionally preceded by one or more suction drums (not shown). The refrigerant compressor 270 comprises at least a first suction inlet 272, and a discharge outlet 279. Optionally, more suction inlets may be available to allow feeding into another stage of compression. As an example, FIG. 2 shows a second suction inlet 271 which allows feeding into the compressor 270 at a pressure that is between the suction pressure at the first suction inlet 272 and the discharge outlet 279. The discharge outlet 279 is fluidly connected to the second tube bundle inlet 211 in the further heat exchanger 535, whereby the refrigerant ambient heat exchanger 285 is provided between the discharge outlet 279 and the second tube bundle inlet 211 in the further heat exchanger and fluidly connected to the discharge outlet 279. Second connecting means connect the refrigerant ambient heat exchanger 285 and the second tube bundle inlet 211 into the further heat exchanger 535. The second connecting means is essentially free from any separate heat exchanger, so that the part 210 of the source refrigerant stream 280 can be passed to the further heat exchanger 535 while maintaining the temperature essentially constant. An optional accumulator (not shown) may be provided in the second connection means downstream of the refrigerant ambient heat exchanger 285. Refrigerant circuit 200 may also be applied on the embodiment of FIG. 1.

Still referring to FIG. 2, the connection of the source refrigerant line 280 and the refrigerant line 210 comprises a splitter 245, arranged to split the source refrigerant stream 280 into the auxiliary refrigerant stream 250 and the part 210 of the source refrigerant stream 280. The discharged auxiliary refrigerant 265 is passed to the second suction inlet 271 into the refrigerant compressor 270 via an optional suction drum (not shown). The spent refrigerant discharged from the further heat exchanger 535 via line 240 is passed to the first suction inlet 272 into the refrigerant compressor 270, via another optional suction drum (not shown).

A separate modification illustrated in FIGS. 2 and 3 relative to FIG. 1 is that more than one refrigerant stream is fed into the further heat exchanger 535. As can be seen in FIGS. 2 and 3, the further heat exchanger 535 is additionally provided with an optional third tube bundle inlet 311 for receiving another refrigerant stream 310. The third tube bundle inlet 311 is, via an optional third tube bundle 312 optionally disposed inside the further heat exchanger 535, connected to a third tube bundle outlet 319 via which the cooled other refrigerant stream is discharged into line 320. The cooled other refrigerant stream 320 may for instance be passed to another heat exchanger (not shown) to perform cooling duty therein.

The other refrigerant stream may be circulated in another refrigerant circuit (not shown) that is separate from refrigerant circuit 200. For example, the refrigerant circuit 200 may be a pre-cooling refrigerant circuit used to produce the cooled hydrocarbon stream 540 and the cooled other refrigerant stream 320 in the form of a pre-cooled main refrigerant stream. The main refrigerant of the main refrigerant stream may be cycled in main refrigerant circuit that is distinct from the pre-cooling refrigerant circuit, such as described in for instance U.S. Pat. No. 6,370,910. In such a case, each of the pre-cooling refrigerant and the main refrigerant may be composed of a mixed refrigerant. A mixed refrigerant or a mixed refrigerant stream as referred to herein comprises at least 5 mol % of two different components. More preferably, any mixed refrigerant comprises two or more of the group consisting of: methane, ethane, ethylene, propane, propylene, butanes and pentanes. Suitably, the pre-cooling refrigerant has a higher average molecular weight than main refrigerant. More specifically the pre-cooling refrigerant in the pre-cooling refrigerant circuit may be formed of a mixture of two or more components within the following composition: 0-20 mol % methane, 20-80 mol % ethane and/or ethylene, 20-80 mol % propane and/or propylene, <20 mol % butanes, <10 mol % pentanes; having a total of 100%. The main cooling refrigerant in the main refrigerant circuit may be formed of a mixture of two or more components within the following composition: <10 mol % $N_2$, 30-60 mol % methane, 30-60 mol % ethane and/or ethylene, <20 mol % propane and/or propylene and <10% butanes; having a total of 100%.

Alternatively, and one embodiment employing this is illustrated in FIG. 3, the pre-cooling refrigerant and the main refrigerant may both be drawn from the refrigerant circuit 200. An example is the so-called Single Mixed Refrigerant processes, of which an example can be found in U.S. Pat. No. 5,832,745. In such a single mixed refrigerant process, the refrigerant being cycled in the refrigerant circuit may be formed of a mixture of two or more components within the following composition: <20 mol % $N_2$, 20-60 mol % methane, 20-60 mol % ethane and/or ethylene, <30 mol % propane and/or propylene, <15% butanes and <5% pentanes; having a total of 100%.

In the embodiment of FIG. 3 the source refrigerant stream 280 is partially, not fully, condensed (for instance in refrigerant ambient heat exchanger 285), and subsequently separated in a pre-cooling refrigerant gas/liquid separator 275 into a vaporous light fraction refrigerant stream and a liquid refrigerant. The vapour light refrigerant stream is discharged at the top of the pre-cooling refrigerant gas/liquid separator 275 into line 310 to be fed to the further heat exchanger 535 via the third tube bundle inlet 311 as the other refrigerant stream. The liquid refrigerant is discharged at the bottom of the pre-cooling refrigerant gas/liquid separator 275 and fed to the splitter 245 wherein it is split into the auxiliary refrigerant stream 250 and the part 210 of the source refrigerant stream 280.

The cooled other refrigerant stream 320 may be partially or fully condensed in the further heat exchanger 535. A part of the condensed other refrigerant stream 320 may be injected into the evaporating refrigerant 230 via optional line 352, optional Joule-Thomson valve 353 an optional combiner 357 provided in line 230. Alternatively or in addition thereto, a part of the condensed other refrigerant stream 320 may be evaporated in another heat exchanger and returned to the refrigerant compressor 270 via optional line 390 and an optional third suction inlet 273 into the refrigerant compressor 270.

The cooled hydrocarbon stream 540 that is discharged from the further heat exchanger 535 may be further treated in a variety of manners. In one group of embodiments, it may be cooled in one or more other heat exchangers against one or both of at least a part of the continuing refrigerant stream 235 being evaporated in another heat exchanger at a lower pressure than the evaporating refrigerant 230 and at least a part of the cooled other refrigerant stream 320. Preferably, at least part of the cooled hydrocarbon stream 540 is cooled to a temperature low enough, such as below −125° C. or preferably below −150° C., to form liquefied natural gas. Such liquefied natural gas be depressurized in an end-flash system or depressurization stage as known in the art, and subsequently stored in a cryogenic liquid storage tank at a pressure of between 1 and 2 bar absolute and a temperature of approximately −162° C. This will not be described in further detail herein.

In another group of embodiments, the cooled hydrocarbon stream 540 may be subjected to one or more extraction steps wherein $C_2+$ hydrocarbons, preferably $C_3+$ hydrocarbons, are extracted from the cooled hydrocarbon stream 540 thereby generating a residue in the form of a methane-enriched hydrocarbon stream. This methane-enriched hydrocarbon stream may be sold as pipe line gas, or subjected to more cooling in the way described in the preceding paragraph, to produce liquefied natural gas. The extracted $C_2+$ hydrocarbons, preferably $C_3+$ hydrocarbons, may be sold and/or further processed, for instance by fractionation into single-component streams including ethane and/or propane and/or butane.

The person skilled in the art will understand that the present invention can be carried out in many various ways without departing from the scope of the appended claims.

What is claimed is:

1. Method of treating a hydrocarbon stream comprising methane, the method comprising:
    providing a wet hydrocarbon stream comprising at least methane and water;
    passing said wet hydrocarbon stream through a wet feed ambient heat exchanger thereby heat exchanging said wet hydrocarbon stream against ambient and thereby providing the wet hydrocarbon stream at a first temperature;
    cooling the wet hydrocarbon stream in a wet feed heat exchanger having a warm end approach temperature, thereby lowering the temperature from the first temperature to a second temperature;
    withdrawing from the wet hydrocarbon stream, in a water removal device at the second temperature, at least one wet disposal stream comprising water from the wet hydrocarbon stream and an effluent stream comprising the wet hydrocarbon stream from which the at least one wet disposal stream has been removed;
    passing the effluent stream to a further heat exchanger;
    passing a refrigerant stream in a compressed condition through an ambient heat exchanger thereby providing a source refrigerant stream at a refrigerant temperature equal to a third temperature, which is within 10° C. from the first temperature;
    passing at least a part of the source refrigerant stream to the further heat exchanger while maintaining the temperature of the source refrigerant stream essentially equal to the third temperature; and,
    cooling both the effluent stream and the at least the part of the source refrigerant stream in the further heat exchanger by indirectly heat exchanging against an evaporating refrigerant fraction;
    wherein said passing of the effluent stream to the further heat exchanger comprises indirectly heat exchanging between the wet hydrocarbon stream and the effluent stream in the wet feed heat exchanger, wherein the effluent stream is heated to restore the temperature of the effluent stream to the first first temperature within the limits of the warm end approach temperature of the wet feed heat exchanger; and,
    wherein said cooling the wet hydrocarbon stream comprises indirectly heat exchanging between the wet hydrocarbon stream and the effluent stream in the wet feed heat exchanger.

2. The method according to claim 1, wherein said indirectly heat exchanging between the effluent stream and the wet hydrocarbon stream comprises passing the wet hydrocarbon stream from a first inlet into the wet feed heat exchanger at the first temperature, through the wet feed heat exchanger in indirect heat exchanging interaction with the effluent stream, to a first outlet from the wet feed heat exchanger, and passing the effluent stream from a second inlet into the wet feed heat exchanger, through the wet feed heat exchanger in indirect heat exchanging interaction with the wet hydrocarbon stream, to a second outlet from the wet feed heat exchanger.

3. The method according to claim 2, further comprising
    passing the wet hydrocarbon stream into the water removal device through a first water removal device inlet into the water removal device and discharging the effluent stream from the water removal device through a vapour outlet from the water removal device; and
    extracting heat from at least one of:
        the wet hydrocarbon stream between the first inlet into the wet feed heat exchanger and the first water removal device inlet;
        the effluent stream between the vapour outlet from the water removal device and the second outlet from the wet feed heat exchanger; and,
        the wet hydrocarbon stream in the water removal device;
    by heat exchanging against an auxiliary refrigerant stream.

4. The method according to claim 3, wherein the auxiliary refrigerant stream and the at least part of the source refrigerant stream are obtained by splitting the source refrigerant stream into said auxiliary refrigerant stream and said at least part of the source refrigerant stream.

5. The method according to claim 4, further comprising at least partially condensing the source refrigerant stream by said passing of said refrigerant stream through said ambient heat exchanger, thereby forming a liquid refrigerant, wherein the auxiliary refrigerant stream comprises at least a part of the liquid refrigerant.

6. The method according to claim 5, wherein partially condensing the source refrigerant stream by said passing of said refrigerant stream through said ambient heat exchanger, and wherein said splitting of the source refrigerant stream comprises subsequently separating the source refrigerant stream into a vaporous light fraction refrigerant stream and said at least part of the liquid refrigerant.

7. The method according to claim 3, further comprising expanding the auxiliary refrigerant stream prior to said extracting heat by heat exchanging against an auxiliary refrigerant stream.

8. The method according to claim 1, wherein the water removal device comprises a separator vessel for separating precipitated components from the wet hydrocarbon stream and, downstream thereof, a sorbing device sorbing at least water.

9. The method according to claim 1, further comprising admitting the effluent stream into the further heat exchanger via a first tube bundle inlet and admitting the at least part of the source refrigerant stream into the further heat exchanger via least one second tube bundle inlet.

10. The method according to claim 9, wherein the temperature of the effluent stream in the first tube bundle inlet is essentially the same as the temperature of the effluent stream that was reached by said indirectly heat exchanging against the wet hydrocarbon stream at said first temperature in the wet feed heat exchanger.

11. The method according to claim 9, wherein the temperature of the effluent stream and the temperature of the at least part of the source refrigerant stream in the first and second tube bundle inlets in the further heat exchanger are less than 10° C. apart from each other.

12. The method according to claim 1, wherein the first temperature of the wet hydrocarbon stream, before said indirect heat exchanging against the effluent stream, is controlled by heat exchanging against ambient; and, wherein the at least part of the source refrigerant stream has a temperature within 10° C. from the first temperature.

13. The method according to claim 1, wherein the wet hydrocarbon stream comprises natural gas, and wherein at least part of the effluent stream is cooled to form liquefied natural gas.

* * * * *